(12) United States Patent
Meehan et al.

(10) Patent No.: US 6,909,753 B2
(45) Date of Patent: Jun. 21, 2005

(54) COMBINED MPEG-4 FGS AND MODULATION ALGORITHM FOR WIRELESS VIDEO TRANSMISSION

(75) Inventors: Joseph Meehan, New York, NY (US); Mihaela van der Schaar, Ossining, NY (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 555 days.

(21) Appl. No.: 10/011,997

(22) Filed: Dec. 5, 2001

(65) Prior Publication Data

US 2003/0103571 A1 Jun. 5, 2003

(51) Int. Cl.$^7$ ................................................ H04N 7/12
(52) U.S. Cl. .................................................. 375/240.27
(58) Field of Search ....................... 375/240.27, 240.07, 375/270.1; 348/419.1, 397.1; H04N 7/12

(56) References Cited

U.S. PATENT DOCUMENTS

| | | | | |
|---|---|---|---|---|
| 5,349,383 A | * | 9/1994 | Parke et al. | 375/240.1 |
| 5,418,571 A | * | 5/1995 | Ghanbari | 375/240.16 |
| 6,275,531 B1 | * | 8/2001 | Li | 375/240.12 |
| 6,639,943 B1 | * | 10/2003 | Radha et al. | 375/240.11 |

FOREIGN PATENT DOCUMENTS

| | | | | |
|---|---|---|---|---|
| WO | WO0139503 | 5/2001 | | H04N/7/24 |

OTHER PUBLICATIONS

Pei et al: "Multi–layered Video Transmission Over Wireless Channels Using An Adaptive Modulation And Coding Scheme" Proceedings 2001 International Conference On Image Processing, ICIP 2001. vol. 2 of 3. Conf. 8, Oct. 7, 2001, pp. 1009–1012.

\* cited by examiner

*Primary Examiner*—Nhon Diep

(57) ABSTRACT

The invention relates to a method and system for modulating an MPEG-4 FGS compressed video stream for variable-bandwidth transmission. A source of a video stream is provided, and a display having means for generating a control input signal for controlling one or more of video compression, error correction code generation, or symbol constellation mapping. The source video stream is compressed using MPEG-4 FGS compression to generate a compressed output video stream. The video compression is optionally performed based upon the control input signal from the display. Error correction code for the compressed video stream may be added, and its generation and addition may be optionally controlled based upon the control input signal from the display. The resulting video symbols may then be mapped to constellations, with this mapping also optionally controlled based upon the control input signal. The resulting compressed output video stream is then transmitted to the display.

19 Claims, 4 Drawing Sheets

COMBINED MPEG-4 FGS AND MODULATION ALGORITHM FOR WIRELESS VIDEO TRANSMISSION

FIELD OF THE INVENTION

The invention relates to a method and system for optimizing the physical layer of an MPEG-4 FGS transmission based on the layer of the video stream being transmitted. In particular, the invention utilizes a unique form of source-channel coding that is specific to scalable video coding schemes, such as the FGS algorithm.

BACKGROUND OF THE INVENTION

"MPEG" generally represents an evolving set of standards for video and audio compression developed by the Moving Picture Experts Group. The need for compression of motion video for digital transmission becomes apparent with even a cursory look at uncompressed bitrates in contrast with bandwidths available. MPEG-1 was designed for coding progressive video at a transmission rate of about 1.5 million bits per second. It was designed specifically for Video-CD and CD-i media. MPEG-2 was designed for coding interlaced images at transmission rates above 4 million bits per second. The MPEG-2 standard is used for various applications, such as digital television (DTV) broadcasts, digital versatile disk (DVD) technology, and video storage systems. MPEG-4 is designed for very low-bit rate applications, using a more flexible coding standard to target internet video transmission and the wireless communications market.

The MPEG4 video compression standard allows content-based access or transmission of an arbitrarily-shaped video object plane (VOP) at various temporal and spatial resolutions. MPEG4 supports both object and quality scalability. Fine granularity scalability ("FGS") is one type of scalable coding scheme that is adopted by the MPEG4 standard. The FGS encoding scheme allows an MPEG4 bitstream to be encoded in two layers: the base layer, which encodes each frame with a fixed lower bound bit-rate; and one or more enhancement layers, which encodes the difference between original picture and the reconstructed base layer picture. The enhancement layer is encoded via a bitplane coding scheme, therefore enhancement layer bitstreams are scalable in the sense that an arbitrary (fine grained) number of bit-planes of the enhancement-layer can be transmitted to the decoder depending on the transmission bandwidth. The FGS coding scheme has been finalized by MPEG4 version 4.

The MPEG-4 decoder may decode only the base layer or the base layer and any subset of the FGS enhancement layer. This is useful when the decoding device is of limited or variant bandwidth and for storage purposes.

FGS Characteristics

The Fine-Granular-Scalability (FGS) Profile, also called the Streaming Profile, has recently been adopted by MPEG-4 as the video coding tool for streaming applications. FGS became the International Standard in March, 2001. FGS offers several advantages for wireless video streaming, including but not limited to the following.

Enabling a streaming server to perform minimal real-time processing and rate control when outputting a very large number of simultaneous unicast (on-demand) streams (unlike transcoding or simulcast approaches).

Providing adaptability to unpredictable bandwidth variations due to heterogeneous access technologies of the receivers (e.g. GSM, etc.) or due to dynamic changes in network conditions (e.g. congestive events).

Allowing scalable-complexity decoding, thereby providing low-power devices (i.e. mobile phones) and common receivers (e.g. set-top boxes and digital televisions), in addition to powerful computers, the opportunity to stream and decode any desired video content with different quality.

Allowing the ability to support both multicast and unicast applications. This, in general, eliminates the need for coding content in different formats to serve different types of applications. Moreover, for multicast applications, the scalable coded streams require less bandwidth for transmission.

Enabling resiliency to packet and bit-error losses, which are quite common over the Internet and wireless networks.

FGS Structure

Additional information regarding the FGS framework is available in "The MPEG-4 Fine-Grained Scalable Video Coding Method for Multimedia Streaming over IP", IEEE Transactions on Multimedia, Vol. 3, No. 1, March 2001, by H. Radha, M. van der Schaar, and Y. Chen, which is hereby incorporated by reference herein.

In addition to the base layer, which is coded with an MPEG-4 compliant non-scalable coder, FGS consists of a single enhancement layer coded in a progressive (fine granular) manner.

The base layer is coded with a bit-rate $R_{BL}$, chosen so that the bit-rate of the available bandwidth (over the time-varying network) is higher than $R_{BL}$ at all times ($R_{BL}<=R_{min}$), where $R_{min}$ is the minimum bit-rate of the bandwidth. Subsequently, the enhancement layer is over-coded at encoding time using a bit-rate ($R_{max}-R_{BL}$), where $R_{max}$ is the maximum bit-rate of the bandwidth. The enhancement layer is then progressively (bit-plane by bit-plane) coded by employing a low-complexity bit-plane embedded-discrete cosine transform (DCT) algorithm. In a progressive order, the more significant bit-planes are transmitted prior to the less significant bit-planes. The enhancement-layer frames are intra-coded, but the coding efficiency from temporal redundancy exploitation is partially retained because the MPEG-4 motion compensated scheme is employed at the base layer.

At the streaming server, the enhancement-layer improves upon the base-layer video, fully utilizing the bandwidth available at transmission time. The FGS structure allows for resilient video transmission, as long as the base-layer video is reliably delivered since the packet- or bit-losses in the enhancement layer do not propagate.

Multicasting with FGS

For multicasting applications, FGS also provides a flexible framework for the encoding, streaming, and decoding processes. Identical to a unicast case, the encoder compresses the content of the video stream using any desired range of bandwidth [$R_{min}=R_{BL}$, $R_{max}=R_{EL}$], where $R_{EL}$ is the bit-rate of the enhancement layer. Therefore, the same compressed streams can be used for both unicast and multicast applications. At the time of transmission, the multicast server partitions the FGS enhancement layer into any preferred number of "multicast channels" each of which can occupy any desired portion of the total bandwidth. At the decoder side, the receiver can "subscribe" to the "base-layer channel" and to any number of FGS enhancement-layer channels that the receiver is capable of accessing (depending, for example, on the receiver access bandwidth). It is important to note that regardless of the number of FGS enhancement-layer channels that the receiver subscribes to, the decoder has to decode only a single enhancement-layer.

Thus, for multicasting, each receiver could receive a different quality video stream, depending on the channel conditions, from the same source encoder. The encoder can split the video data between the base layer and the enhanced layers depending on the predicted channel conditions.

Furthermore, the FGS coding scheme standardized by MPEG-4 also contains FGS temporal scalability in addition to the previously described FGS signal to noise ratio (SNR)-scalability. Moreover, spatial scalability can also be easily added, as is well known. Hence, FGS trade-offs can be made in SNR, temporal and spatial dimensions and various priorities can be assigned to the various layers. In this context various FEC levels can be assigned to the different layers, to ensure unequal error protection. Such a method can be performed also depending on the capabilities of the various devices involved.

Current wireless communication systems have been developed in an independent fashion. The physical layer, the MAC layer and the source coding have all been developed independently from each other. Each layer has been optimized for efficiency to the extent possible. For future improvements, a combined form of algorithm is required, that crosses the different layers.

Thus, there is a desire for a method of and system for combining MPEG-4 FGS encoding with modulation to enhance the optimizing of a video stream for wireless transmission.

SUMMARY OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings.

To achieve these and other advantages and in accordance with the purpose of the invention, as embodied and described, the invention includes a method of modulating a compressed video stream for variable-bandwidth transmission, in which the compressed video stream uses Fine Granularity Scalable (FGS). First, a source of a video stream is provided, as well as a display having means for generating a control input signal for controlling video compression. The source video stream is then compressed using a video compression with FGS to generate a compressed output video stream having a base layer and at least one enhancement layer. The video compression performed is based upon the control input signal from the display. The resulting compressed output video stream is next transmitted for display.

In another embodiment, the channel coding of the transmission of the compressed video stream is made robust and less robust by hierarchical modulation of a physical layer of the transmitted video stream.

In yet another embodiment, the channel coding of the transmission of the compressed video stream is made robust and less robust by time division modulation of a physical layer of the transmitted video stream.

In another embodiment, invention also includes a method of modulating a compressed video stream for variable-bandwidth transmission, in which the compressed video stream uses FGS. A source of a video stream and a display having means for generating a control input signal for controlling error correction code generation are provided. Next, the video stream from the source is compressed using a compression with FGS, such as MPEG-4 FGS compression, to generate a compressed output video stream.

Error correction code is then generated for the compressed video stream, and control of the error correction code generation is based upon the control input signal from the display. Next, the generated error correction code is added to the compressed output video stream to generate a compressed output video stream with error correction code, which is then transmitted to the display.

In still another embodiment, the invention includes a method of modulating a compressed video stream for variable-bandwidth transmission, in which the compressed video stream uses FGS. First a source of a video stream and a display having means for generating a control input signal for controlling mapping of video symbols to constellations are provided. Next, the video stream from the source is compressed using a compression with FGS to generate a compressed output video stream. The video symbols of this compressed video output stream is then mapped to constellations, and the mapping is controlled based upon the control input signal from the display. The resulting mapped compressed output video stream is then transmitted to the display.

The invention also includes a system for modulating a compressed video stream for variable-bandwidth transmission, wherein the compressed video stream uses Fine Granularity Scalable (FGS). The system includes a source of a video stream, a display having means for generating a control input signal for controlling video compression, a video stream compression engine with FGS for generating a compressed output video stream from the video source stream, with the video compression being performed based upon the control input signal from the display, and a transmitter for transmitting the compressed output video stream to the display.

It is understood that both the foregoing general description and the following detailed description are exemplary and are intended to provide further explanation of the invention claimed.

The accompanying drawings, which are incorporated in and constitute part of this specification, are included to illustrate and provide a further understanding of the method and system of the invention. Together with the description, the drawings serve to explain the principles of the invention.

DETAILED DESCRIPTION OF THE PREFERRED EMBODIMENTS

The following description is presented to enable any person of ordinary skill in the art to make and use the present invention. Various modifications to the preferred embodiment will be readily apparent to those of ordinary skill in the art, and the disclosure set forth herein may be applicable to other embodiments and applications without departing from the spirit and scope of the present invention and the claims hereto appended. Thus, the present invention is not intended to be limited to the embodiments described, but is to be accorded the broadest scope consistent with the disclosure set forth herein.

In accordance with the present invention, a system and method is provided for modulating a Fine Granularity Scalable video stream for reduced-bandwidth transmission. For purpose of illustration, and not limitation, the method and system embodied herein are directed to optimizing the physical layer of an MPEG-4 FGS transmission. Although reference is made to MPEG-4 compression, the method and system may be used with alternative signal compression technology as available or developed. In accordance with the invention such optimization is based on the layer of the video stream being transmitted and upon feedback from a receiver or display device to display the video stream.

Advantageously, the system and method may involve application of one of several modulation algorithms to the physical layer, the MAC layer and/or the source coding layer, either individually or in various combinations. This modulation is optionally controlled by a control signal from a display device.

Figure 1:
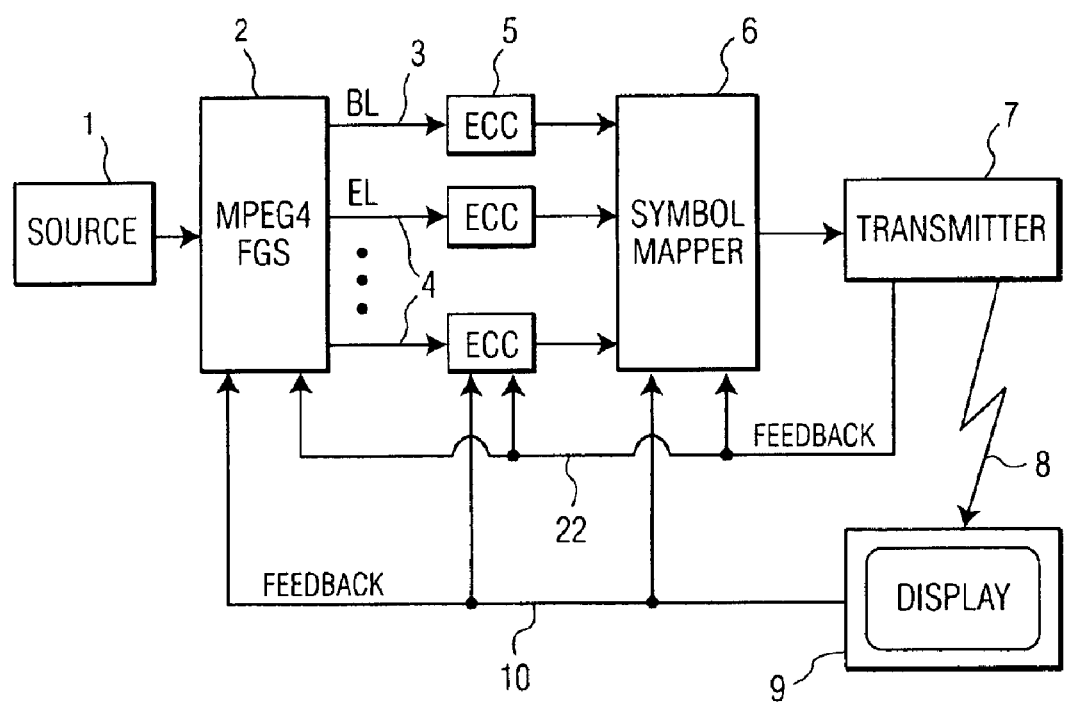
FIG. 1 is a diagram of a representative combined FGS modulation scheme in accordance with a preferred embodiment of the current invention.

FIG. 1 is a diagram of a representative system and process for modulating the transmitted video stream based upon control input from a receiver/display.

In accordance with this embodiment, a video stream from a video source 1 is input to an MPEG-4 FGS compression engine 2. The video source 1, for example, may be a live video feed or any previously recorded video in any format. The video source 1 thus may be in standard television format, or any other format for which there is an MPEG-4 compression engine 2.

An MPEG-4 compression engine 2, or the like, may be specialized software or firmware operating on a general or specialized microprocessor. For example, an MPEG-4 compression engine 2 may be encoded within a specialized video processing computer chip or chipset. Likewise, a compression engine 2 may alternatively be embodied in specialized software running on a general-purpose computer chip, such as on a conventional microcomputer.

The result of a typical MPEG-4 compression using FGS is the generation of a base layer 3 and one or more enhancement layers 4. The purpose and general use of the base layer 3 and enhancement layer(s) 4 are partially discussed herein and well known in the art.

Optionally, and in accordance with a preferred embodiment of the present invention, error correction code (ECC) 5 may be added to each layer. ECC 5 generally functions by adding information to the base layer 3 and to the enhancement layer(s) 4 data, which allows for some part of the original layers to be reconstructed when some data has been lost during processing or transmission. The ECC 5, thereby, may be made more or less robust, depending upon how much bandwidth the ECC 5 is to use. The term "robust" as defined herein is well known in the art and generally refers to the ability or lack thereof to recover from data loss or corruption, without limitation. For example, a minimal approach to ECC 5 is to place a single checksum bit at the end of each packet to which ECC 5 is applied. This level of protection only allows the reconstruction of a single bit of lost data. As more ECC 5 bits are added, the possibility of reconstructing greater amounts of lost data. This and alternative methods and requirements of ECC 5 are well known to one skilled in the art. As with the MPEG-4 FGS compression 2, the generation and appending of ECC 5 to the base layer 3 and enhancement layer(s) 4 may be accomplished in many ways, including the use of specialized or general processors running computer software or firmware. The addition of ECC 5 is not mandatory to practice the invention, and one may omit ECC 5 altogether if desired.

In addition to, or as an alternative to, the application of ECC 5 in accordance with the invention, the method and system can further include a symbol mapper 6. As described herein, the symbol mapper 6 controls the mapping of the base layer 3 and enhancement layer(s) 4 to constellations (also described herein). The symbol mapper 6, as is well known in the are, may be software, firmware or the like running on any of a variety of hardware platforms. Ultimately the compressed stream, as altered by the ECC 5 and symbol mapper 6 if provided, forms the package to be transmitted.

The transmission package is sent to the transmitter 7, whereupon it is transmitted 8 to a receiver, such as a display device 9, or the like (hereinafter, "display"). Transmission may be by any available communications protocol on any communication line or network. This includes wireless transmission such as by mobile cellular communications networks, as well as transmission over hard-wire networks and the Internet or the like.

In accordance with the invention the display is enabled to generate and send a feedback control signal 10 to at least one of or any combination of the MPEG-4 FGS compression engine 2, the ECC 5 module, or the symbol mapper 6. This feedback control signal 10 is generated to modulate and ultimately optimize the transmitted MPEG-4 FGS compressed video stream sent to the display 9.

A Signal Quality Indicator (SQI) can be fed back from the display to control the transmitter. The value fed back can be the signal-to-noise ratio (SNR) per FGS layer, the bit error rate or some other common SQI.

This SQI may be received by the transmitter and may be fed back to the symbol mapper 6, the ECC 5 module or the MPEG 4 FGS compression engine 2, or any combination thereof, as may be desired. As an example, if the SQI is bad (i.e. many errors at the receiver), the LSBs in the symbol mapper 6 can be set to a fixed value (i.e., for example, no enhanced layer mapped onto them) and this will make the lower layers more robust.

As another example, if SQI is bad, the ECC 5 module may increase the ECC to make the layers more robust. By changing any of these factors, the rate of the MPEG 4 FGS streams may have to be adapted. If the SQI is good, the ECC 5 module may reduce the ECC and the MPEG 4 FGS bit rates may thereby be increased to send more information. In this manner, the display can control the adaptation of the total transmitter system.

As an example, a display 9 with no ability to display color video (i.e., a "black and white" display) could thus generate a feedback control signal 10 to the MPEG-4 FGS compression engine 2 instructing the engine to only encode black and white (and grayscale) information.

In another embodiment, a display 9 with a very constricted bandwidth or a small display might generate a feedback control signal 10 to the ECC 5 module to increase the ECC 5 of the base layer 3 relative to the ECC 5 of any enhancement layer(s) 4.

Figure 2:
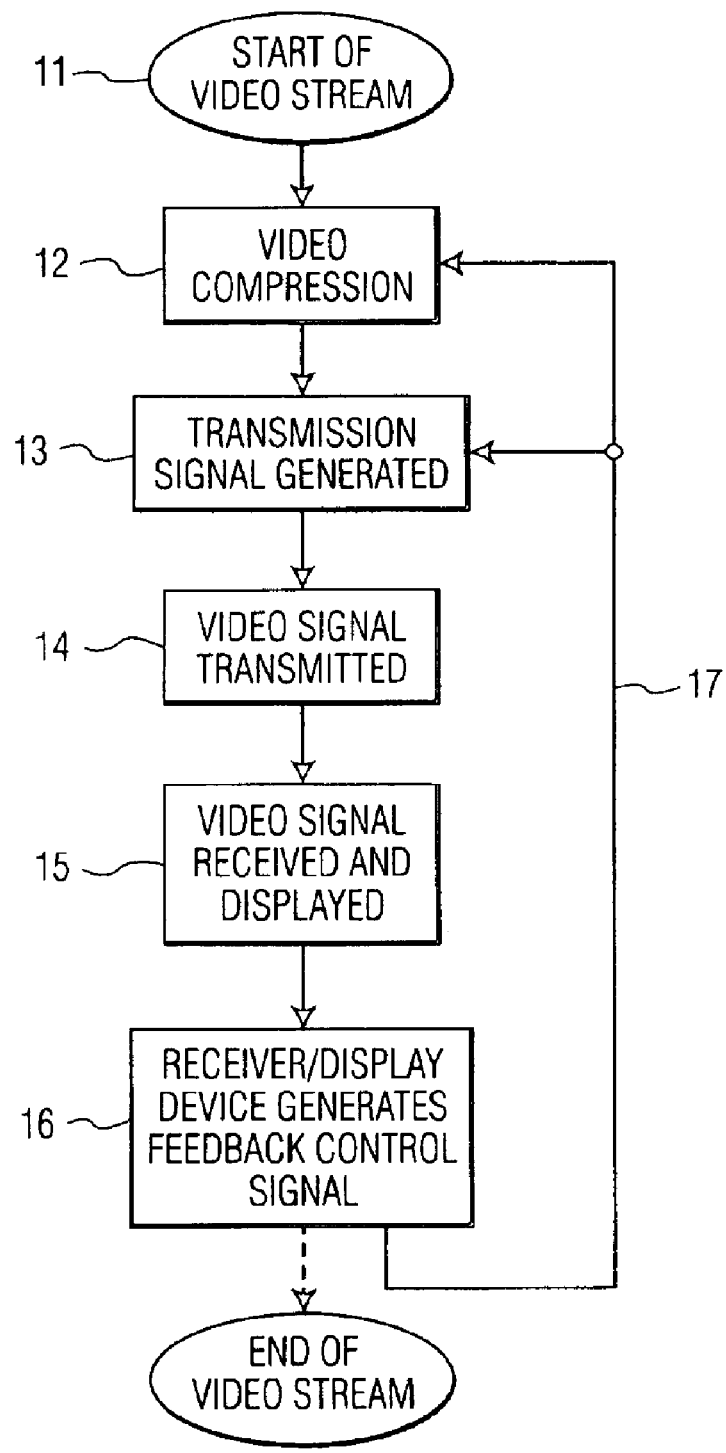
FIG. 2 is a flowchart of a representative process of the current invention for modulation of a video stream by use of feedback from a client receiver/display device.

FIG. 2 is a flowchart of a representative process for modulation of a video stream by use of a feedback from a display receiver/display device. At the start of the source video stream 11, the stream undergoes video compression 12 using an MPEG-4 FGS compression engine or the like as previously described. The compression engine is designed to accept control input from a receiver or display device, or even from a signal transmitter device. At first, however, there may not be a feedback controlling signal yet generated, so the compression engine could then use a reasonable default set of compression parameters. Likewise, the compression engine could start with a recently-used set of compression parameters. Similarly, if the display to which the stream is transmitted is not capable of generating a control signal, then in accordance with another aspect of the invention, modulation can be controlled by the default values provided.

The compressed video stream produced by the video compression step 12 is then passed to a transmitter, which packages the stream for transmission 13, and then transmits the stream containing the video information 14 to a display.

A receiver and/or display device next receives, decodes and displays the video 15. The receiver/display device may then generate a feedback control signal to control modulation of the video stream, such as by the video compression step 16. This process continues until the end of the video stream is reached 18, whereupon the process is ended.

Optionally, post-compression steps, such as adding ECC and symbol mapping, may also be modulated by a feedback from a receiver/display device.

Furthermore, a display 9 might alter the mapping of the constellations to which the base layer 3 and the enhancement layer(s) 4 are mapped. The symbol mapper takes all the bit streams from the different FGS layers and maps them onto a constellation (such as a Quadrature Amplitude Modulation (QAM) constellation). The mapping is such that the FGS base layer is mapped onto the MSBs and the higher the enhanced layer the least significant the bits are in the symbol transmitted.

The base layer data can be mapped to the MSBs of the transmitted stream and the enhanced layers can be mapped to the LSBs. The channel coding on the different layers can be different (i.e. more robust coding on the base layer). This added coding on any layer results in a more robust layer transmission, but with the trade off of a lower bit rate for that layer.

An example of one method for making a stream more robust is by increasing the channel coding on the stream or lowering the number of bits per symbol transmitted (for example 4QAM is more robust than 16QAM). The more robust a stream is the less bit errors there will be at a receiver—which equates to less packet errors—which means less video drop outs on the screen.

Figure 3:
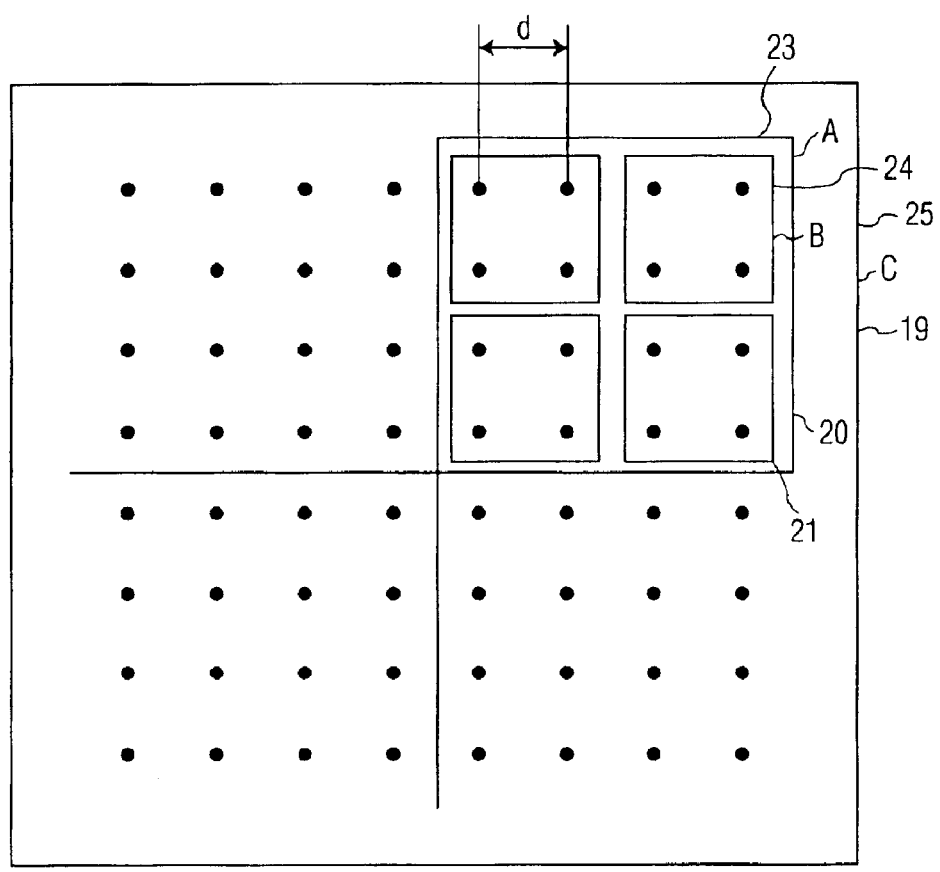
FIG. 3 is a diagram depicting a 64QAM constellation as used in a representative embodiment of the current invention.

An example could be a QAM constellation. The number of bits required and the constellation sizes are shown in Table 1. A multi-size constellation is shown in FIG. 3. This is also known as hierarchical modulation.

TABLE 1

| No. Bits | Bit Representation | Constellation |
| --- | --- | --- |
| 2 | A1A0 | 4 QAM |
| 4 | B1B0A1A0 | 16 QAM |
| 6 | C1C0B1B0A1A0 | 64 QAM |
| 8 | D1D0C1C0B1B0A1A0 | 256 QAM |

FIG. 3 is a diagram depicting a 64QAM constellation as used in a representative embodiment of the current invention, having 3 constellation subsets. All the symbols inside square A of FIG. 3 have the same A1 and A0 (the rest of the bits can be don't cares). There are 4 such symbols in the constellation of FIG. 3. This is a noisy 4QAM constellation. There are 16 constellation B subsets symbols in the complete constellation. For each constellation subset B the bits A1 A0 B1 B0 are the same. This can be considered a 16QAM constellation. The constellation C is the complete constellation and uses each of the symbols. Each of the constellation subsets also has a Euclidean distance between them (the number of bits that are different).

Based on the constellation in FIG. 3, a decision device (slicer) will choose the received symbol closest to a constellation symbol. This can be achieved simply by slicing the constellation until the received symbol is in a specific sliced subset.

Assuming, for example, that a receiver X is only able to receive the base layer (in this case the base layer is mapped onto 2 bits (A1 A0)—4QAM). Receiver Y can receive only one enhanced layer (total number of bits is 4 (A1 A0 B1 B0)—16QAM). Another receiver Z can receive two enhanced layers (number of bits is 6 (A1 A0 B1 B0 C1 C0)—64QAM). In this case, each layer has a bit rate of 2×bits per second (bps), where x is the number of symbols per second. From FIG. 3, receiver X would slice on the region represented by A, receiver Y would slice on the region represented by B, and receiver Z would slice on the region represented by C on each point in the constellation. The distance between each symbol in the constellation is d. The average distance between each B region, in FIG. 3, is 2 d, and between each A region is 4 d. Hence, each layer of this example is approximately 1.5 decibels more robust than the next. In accordance with one aspect of the invention, more robustness therefore can be added by coding each of the layers independently with the loss of bit rate, as controlled by the feedback control signal. For example, the base layer may be mapped onto the 2 MSBs of a 16QAM constellation and the enhancement layer may be mapped onto the 2 LSBs of a 16QAM constellation. Rate ½ convolutional coding could be added to either one or both of the layers and in this case it would be more robust but the bit rate would be halved.

Alternatively, and in accordance with another aspect of the invention, the base layer could be mapped to a lower level constellation than the enhanced layer (i.e. 4 level QAM for the base layer and 16 level QAM for the enhanced layer). The channel coding could be different for each layer. This would also result in a more robust base layer transmission. In this mode the bit rate for the base layer would be less than the bit rate for the enhanced layer. For example and as embodied in FIG. 1, the base layer 3 could have 2 bits per symbol while the enhanced layer 4 would have 4 bits per symbol. The base layer 3 and the enhanced layer 4 would be multiplexed onto the data stream. For example, two base layer bits could be sent, then one enhanced layer bit, and this would repeat. The receiver may know when the stream is base layer or enhanced layer, so it can switch the receiver constellation in the decision device (slicer) to the appropriate constellation.

Figure 4:
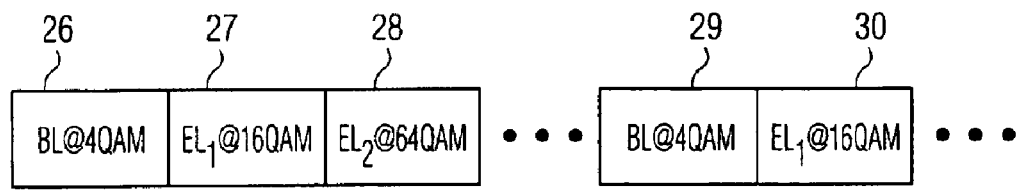
FIG. 4 is a schematic diagram of a representative process of the current invention for multiplexing of various MPEG-4 FGS layers onto physical layers.
Figure 5:
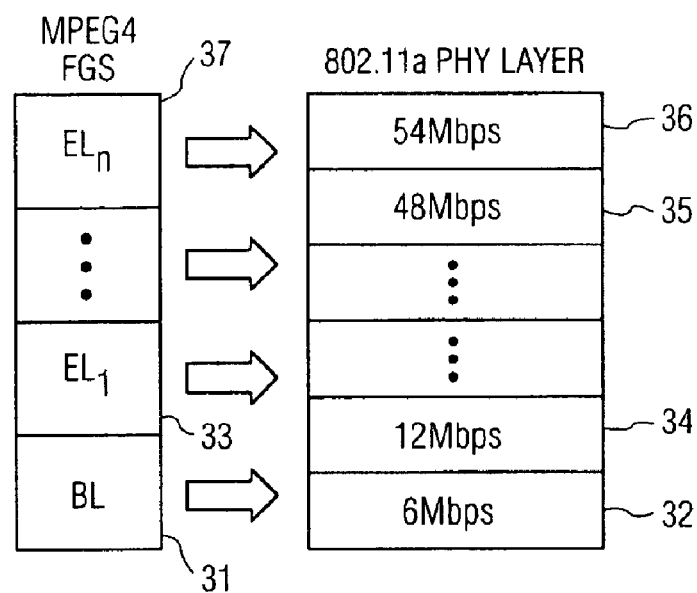
FIG. 5 depicts an example of MPEG-4 FGS layer packets mapping onto an IEEE 802.11a LAN physical layer encod-

This is known as time division modulation and is shown in FIGS. 4 and 5. Time division multiplexing may be mapped onto a typical packetized wireless local area network (LAN), such as one designed in accordance with the IEEE 802.11a or IEEE 802.11b specifications.

The multiplexing of various MPEG-4 FGS layers onto physical layers is diagrammed in FIG. 4 for illustrative purposes. A base layer packet is encoded and transmitted on the physical system as a 4QAM constellation packet 26, having a relatively high degree of robustness. This packet may be followed by an enhanced layer packet transmitted on the physical layer as a 16QAM constellation packet 27, with a lesser degree of robustness. Any number of enhancement layers with varying degrees of robustness may then be transmitted. For example, FIG. 4 shows a 64QAM constellation enhancement layer packet being transmitted next 28. Ultimately, more base layer packets, such as that depicted as a 4QAM constellation packet 29, and more enhanced layer packets, such as the 16QAM constellation packet 30, may be transmitted as well.

FIG. 5 is an example of how MPEG-4 FGS layer packets may be mapped onto IEEE 802.11a LAN physical layer encoding. As an example, a base layer packet 31 may be mapped onto the most robust 6 Mbps physical layer 32. An enhanced layer 33 may then be mapped onto a less robust 12 Mbps 34 or other physical layer (such as 48 Mbps 35 or 54 Mbps 36, as shown, or any other provided by IEEE 802.11a).

As previously noted, the compressed video stream, as modulated in accordance with the control signal, including modulation of the video compression, the ECC generation, and/or symbol mapping, is then transmitted to the display.

It will be apparent to those skilled in the art that various modifications and variations can be made in the method and system of the present invention without departing from the spirit and scope of the invention. Thus, it is intended that the present invention include modifications and variations that are within the scope of the appended claims and their equivalents.

What is claimed is:

1. A method of modulating a compressed video stream for variable-bandwidth transmission, wherein the compressed video stream uses Fine Granularity Scalable (FGS), the method comprising:

compressing a video stream received from a video stream source using a video compression with FGS to generate a compressed output video stream having a base layer and at least one enhancement layer, wherein the video compression is performed in response to a feedback control input signal received from a display, the feedback control signal for use in controlling a modulation and optimization of the compressed output video stream; and transmitting the compressed output video stream to the display.

2. The method according to claim 1, wherein the video compression is MPEG-4 FGS video compression.

3. The method according to claim 1, wherein the video compression defines an amount of base layer of the video stream to be mapped to most significant bits (MSBs) and an amount of enhancement layer to be mapped to least significant bits (LSBs), wherein responsive to the feedback control input signal from the display, the video compression is modified to change an amount of the base layer mapped to the MSBs of the compressed video stream.

4. The method according to claim 3, wherein the transmission of the compressed video stream uses a robust channel coding for the MSBs and a less robust channel coding for the LSBs.

5. The method according to claim 1, wherein the video compression of the video stream includes mapping the base layer to a lower constellation than the at least one enhanced layer.

6. The method according to claim 1, wherein the transmission of the compressed video stream uses a robust channel coding for the base layer and a less robust channel coding for the at least one enhanced layers.

7. The method according to claim 6, wherein the channel coding is made robust and less robust by hierarchical modulation of a physical layer of the transmitted video stream.

8. The method according to claim 6, wherein the channel coding is made robust and less robust by time division modulation of a physical layer of the transmitted video stream.

9. A method of modulating a compressed video stream for variable-bandwidth transmission, wherein the compressed video stream uses FGS, the method comprising:

compressing a video stream received from a video stream source using a compression with FGS to generate a compressed output video stream;

generating error correction code for the compressed video stream, wherein the error correction code generation is controlled in response to a feedback control input signal received from a display the feedback control input signal for controlling error correction code generation;

adding the error correction code generated to the compressed output video stream to generate a compressed output video stream with error correction code; and transmitting the compressed output video stream with error correction code to the display.

10. The method according to claim 9, wherein the video compression is MPEG-4 FGS video compression.

11. A method of modulating a compressed video stream for variable-bandwidth transmission, wherein the compressed video stream uses FGS, the method comprising:

compressing a video stream received from a video stream source using a compression with FGS to generate a compressed output video stream;

mapping video symbols to constellations, wherein the mapping is controlled in response to a feedback control input signal received from a display, the feedback control input signal for controlling mapping of the video symbols to constellations; and transmitting the compressed output video stream to the display.

12. The method according to claim 11, wherein the video compression is MPEG-4 FGS compression.

13. A system for modulating a compressed video stream for variable-bandwidth transmission, wherein the compressed video stream uses Fine Granularity Scalable (FGS), the system comprising:

a video stream compression engine with FGS for generating a compressed output video stream received from a source of a video stream, wherein the video compression is performed in response to a feedback control input signal received from a display, the feedback control input signal for use in controlling a modulation and optimization of the compressed output video stream; and a transmitter for transmitting the compressed output video stream to the display.

14. The system according to claim 13, wherein the video compression used is MPEG-4 FGS video compression.

15. The system according to claim 13, further comprising:

an error correction code generator, wherein the error correction code generator is controlled in response to the feedback control input signal for generating error correction code for the compressed video stream, said error correction code being added to the compressed video stream.

16. The system according to claim 13, further comprising:

a symbol mapper, wherein the symbol mapper is controlled in response to the feedback control input signal for mapping video symbols of the compressed video stream to constellations prior to transmission of the compressed video stream.

17. The system according to claim 13, wherein channel coding of the compressed video stream is made robust or less robust by hierarchical modulation of a physical layer of the prior to transmission of the compressed video stream.

18. The system according to claim 13, wherein channel coding of the compressed video stream is made robust or less robust by time division modulation of a physical layer of the prior to transmission of the compressed video stream.

19. A method of modulating an MPEG-4 FGS compressed video stream for variable-bandwidth transmission, the method comprising:

compressing a video stream received from a video stream source using a video compression with FGS to generate a compressed output video stream, wherein the video compression is optionally performed in response to a feedback control input signal received from a display;

generating and adding error correction code for the compressed video stream, wherein error correction code generation and addition is optionally controlled in response to the feedback control input signal received from the display;

mapping video symbols to constellations, wherein mapping is optionally controlled in response to the feedback control input signal received from the display the feedback control input signal for use in controlling one or more of video compression, error correction code generation, or symbol constellation mapping; and transmitting the compressed output video stream to the display.

* * * * *